T. W. VARLEY.
INDICATOR.
APPLICATION FILED APR. 28, 1913.
1,207,099.
Patented Dec. 5, 1916.
2 SHEETS—SHEET 1.
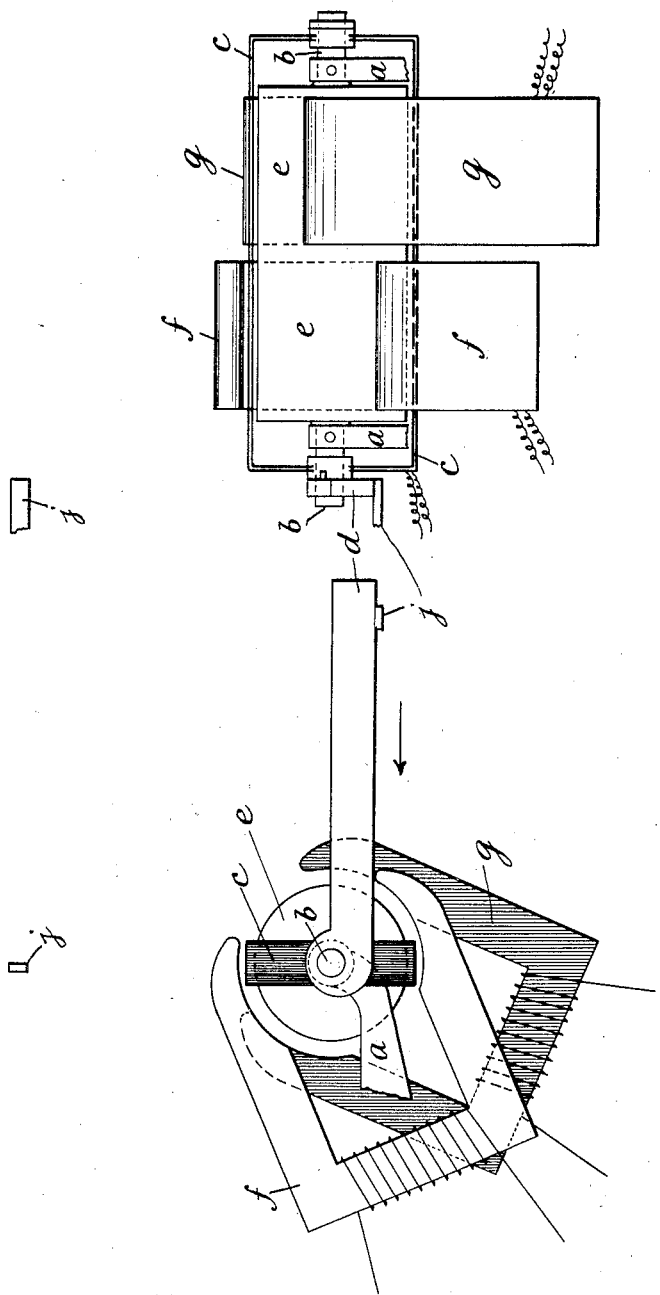

T. W. VARLEY.
INDICATOR.
APPLICATION FILED APR. 28, 1913.
1,207,099.
Patented Dec. 5, 1916.
2 SHEETS—SHEET 2.
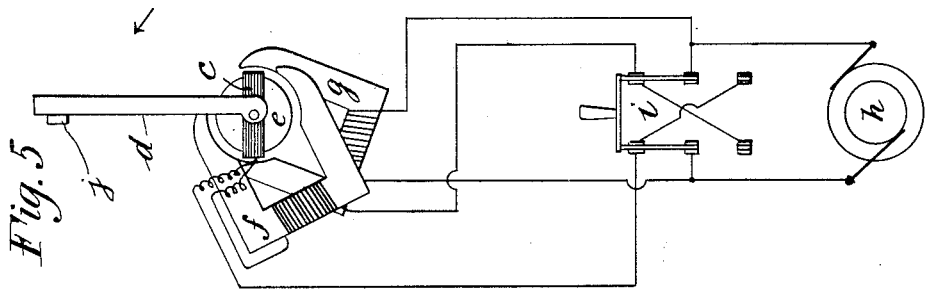
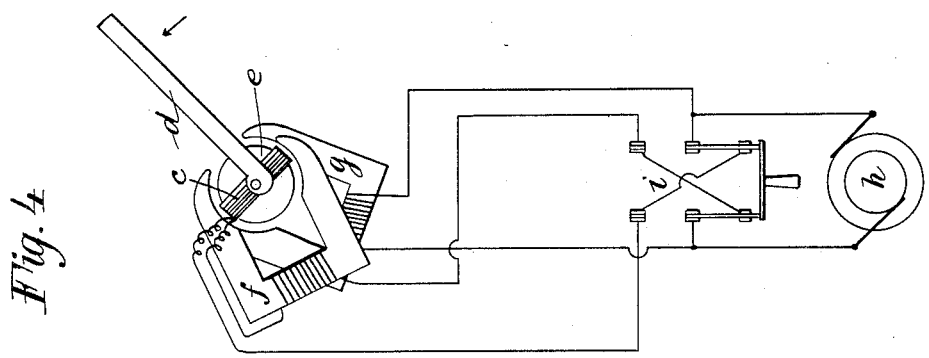
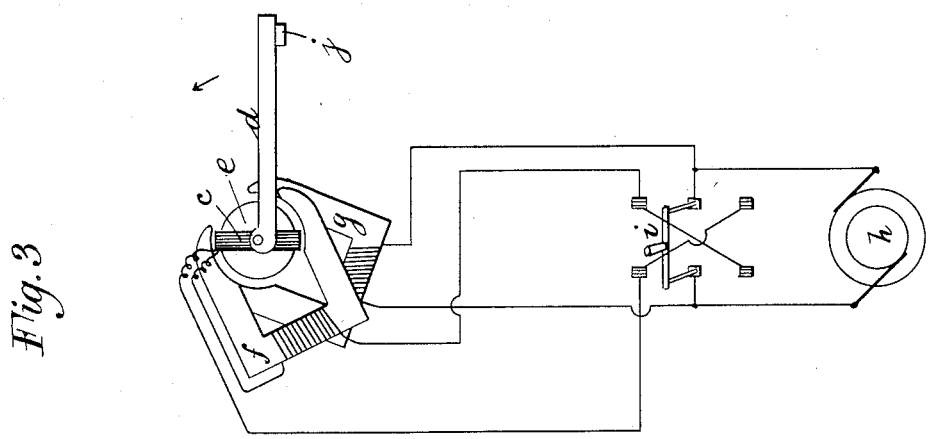
WITNESSES:
INVENTOR
Thomas W. Varley
BY
his ATTORNEY

UNITED STATES PATENT OFFICE.

THOMAS W. VARLEY, OF NEW YORK, N. Y.

INDICATOR.

1,207,099. Specification of Letters Patent. Patented Dec. 5, 1916.

Application filed April 28, 1913. Serial No. 764,115.

*To all whom it may concern:*

Be it known that I, THOMAS W. VARLEY, a citizen of the United States of America, and a resident of the borough of Manhattan, city, county, and State of New York, have invented certain new and useful Improvements in Indicators, of which the following is a specification.

This invention relates to indicators of the type particularly applicable in connection with railway signaling and has as its object the improvement of such devices with especial reference to those of the continuous-direction three-position type. In such devices as heretofore used it has been customary to control the movement of the signal arm through the operation of a plurality of relays but, so far as I am aware, such control has not hitherto been effected directly by the current and without the interposition of relays or other equivalent means.

One object of my invention therefore is to provide an indicator of the class described wherein movement is imparted to a movable part, such as an armature, by current in either positive or negative direction, such movement to distinguish the positive current from the negative current by the amount of the movement and the movement in each case to be in the same direction. For example the signal arm to be at "danger" for no current, at "caution" for say, negative current and at "clear" for positive current, the terms "positive" and "negative" when used in connection with a continuous or direct current, having the usual signification but when used in connection with alternating current to refer to some phase of the current as a standard—as for instance, the current may be positive or negative relative to the voltage though both be continually changing.

My invention therefore relates to a direct circuit-control, either by alternating or direct current, of a continuous-direction three-position signal giving a direct reading of the signal.

It will be obvious from the following description that the invention in its broadest aspect is not necessarily to be restricted to a three-position device as the broad principle is as well applicable to a two-position device or a device having more than three positions.

In the following I have described, in connection with the accompanying drawings, one form of device illustrating the application of the principles of my invention, the features thereof being more particularly pointed out hereinafter in the claims.

In the drawings Figure 1 is an end view, partly diagrammatic, of an indicator illustrating one way of carrying out my invention; Fig. 2 is a front view of the same looking in the direction of the arrow Fig. 1; Fig. 3 is a diagrammatic view of the same showing the circuit in connection therewith, the circuit being open and the signal at "danger;" Fig. 4 is a view similar to Fig. 3, the circuit being closed and the signal at "caution;" and Fig. 5 is another view similar to Figs. 3 and 4 with the switch reversed from the position shown in Fig. 4 and the signal at "clear."

Similar letters of reference indicate similar parts throughout the several views.

In the drawings $a$, $a$ indicate suitable supports or brackets acting as bearings for the armature shaft $b$ on which the armature $c$ is mounted. Signal arm $d$ is keyed to one end of shaft $b$. The core $e$ is supported by brackets or supports $a$, $a$ in any convenient manner.

$f$ and $g$ indicate electromagnets having windings supplied with current from a source $h$, here shown as a source of alternating current, one of said fields or field windings as $f$ being controlled by a switch $i$. The switch $i$ is shown as a pole changing switch. The armature winding is shown as in the same circuit as one of the field windings, in the instance illustrated with the left hand field winding $f$.

$j$, $j$ indicate stops for limiting the range of movement of signal arm $d$.

In the operation of the device, with no current in the armature winding or in the field $f$, the signal arm will stand at danger. With, say a negative source of current on the armature winding and field $f$, and a positive source on the field winding $g$ the signal will stand at "caution." With, say a positive source on all windings the signal will go to "clear." In other words with current in the windings a torque is produced on the armature to move the signal arm $d$ in the direction of the arrows. The armature is in the field of magnet $f$ only, at the beginning of the movement and until the 45° position is reached one end of the armature moving into the field of magnet $g$, when the 45° position is reached and remaining in the field of magnet $g$ from the 45° position to the 90° position. With current of one direction (say negative) in the windings of magnet $f$ and armature $c$ and current in the other direction (say positive) in the winding of magnet $g$, the armature takes up a 45° position as soon as it comes under the influence of magnet $g$. If however the current in the windings of magnet $f$ and armature $c$ is now made positive the armature will continue its rotation on to say the 90° position. In this manner the degree or amount of movement of the armature is caused to distinguish between positive and negative currents and the movement of the armature is in but one direction. If a direct current source were used instead of an alternating current source and the relation of positive and negative current held to, the same effect would take place. In this case, the magnet $g$ could be permanently magnetized instead of being an electromagnet.

The signal arm may be counterweighted to cause it to drop to danger when the current is off the armature coil, or the winding on magnet $f$. If current should be off of the winding on magnet $g$ and on the winding on magnet $f$ and the armature, the signal arm would indicate "caution." If magnet $g$ was a permanent magnet and, say positively magnetized similarly to the condition when used as an electro-magnet, then if current in winding on magnet $f$ and in the armature is positive, the signal will go to "clear" but if this latter current is negative, the signal will go to "caution."

It is obvious that there may be many variations in construction and arrangement without departing from the broad principle of the invention and I do not restrict myself to any of the details shown and described further than the scope of the appended claims demand.

What I claim and desire to secure by Letters Patent is:

1. In an indicator a signal arm and means for imparting a continuous-direction three-position movement thereto including a plurality of magnets and an armature, the windings of one of said magnets and of the armature being in the same electrical circuit and under the influence of a reversible current, another of said magnets being in another circuit and under the influence of a single direction current.

2. In an indicator a signal arm and means for imparting a continuous-direction three-position movement thereto including a plurality of magnets angularly displaced with reference to each other, and an armature, the windings of one of said magnets and of the armature being in the same electrical circuit and under the influence of a reversible current, another of said magnets being in another circuit and under the influence of a single direction current, the armature being capable of moving from the field of one of said magnets into the field of the other of said magnets.

3. In an indicator a signal arm and means for imparting a continuous-direction three-position movement thereto including a plurality of magnets angularly displaced with reference to each other, and an armature, the windings of one of said magnets and of the armature being in the same electrical circuit and under the influence of a reversible current, another of said magnets being in another circuit and under the influence of a single direction current, the armature being arranged to come serially under the influence of said magnets.

4. In an indicator a signal arm and means for imparting a continuous-direction three-position movement thereto including a plurality of magnets angularly displaced with reference to each other, and an armature, the windings of one of said magnets and of the armature being in the same electrical circuit and under the influence of a reversible current, another of said magnets being in another circuit and under the influence of a single direction current, the armature being arranged to come serially under the influence of said magnets and to have a continuous motion in one direction imparted thereto.

5. In an indicator a moving member comprising an armature and a signal arm controlled thereby, and means for magnetically controlling the movement of said armature comprising a plurality of magnets, the windings of one of said magnets and of said moving member being in the same electrical circuit and under the influence of a reversible current, another of said magnets being in another circuit and under the influence of a single direction current, so that the moving member begins its motion under the influence of one of said magnets and passes under the influence of the other of said magnets.

6. In an indicator a moving member comprising an armature and a signal arm controlled thereby, and means for magnetically controlling the movement of said armature comprising a plurality of magnets, the windings of one of said magnets and of said moving member being in the same electrical circuit and under the influence of a reversible current, another of said magnets being in another circuit and under the influence of a single direction current, so that the moving member begins its motion under the influence of one of said magnets and passes under the influence of the other of said magnets and when the currents are in a certain direction has imparted thereto a continuous motion in one direction through the fields of both magnets.

7. In an indicator a signal arm and means for imparting a continuous-direction three-position movement thereto including an electromagnet, an armature in series relation with the winding of said electromagnet, a second electromagnet angularly displaced with reference to said first magnet, a source of electricity for both of said electromagnets and means for reversing the current from said source through said first named magnet and the armature.

8. In an indicator a signal arm and means for imparting a continuous-direction three-position movement thereto including a plurality of magnets, an armature having its windings in circuit with one of said magnets and both under the influence of a reversible current, another of said magnets being in another circuit and under the influence of a single direction current, said armature being arranged to come serially under the influence of said magnets and to have continuous motion in one direction imparted thereto, a source of electricity and means for reversing the direction of the current through the armature and the magnet in electric circuit therewith.

9. In an indicator a signal arm and means for imparting a continuous-direction three-position movement thereto including a plurality of magnets and an armature, the windings of one of said magnets and of the armature being in series in the same electrical circuit and under the influence of a reversible current and another of said magnets being in another circuit and under the influence of a single direction current.

10. In an indicator a signal arm and means for imparting a continuous-direction three-position movement thereto including a plurality of magnets angularly displaced with reference to each other, and an armature, the windings of one of said magnets and of the armature being in series in the same electrical circuit and under the influence of a reversible current, another of said magnets being in another circuit and under the influence of a single direction current, the armature being capable of moving from the field of one of said magnets into the field of the other of said magnets.

11. In an indicator a signal arm and means for imparting a continuous-direction three-position movement thereto including an electromagnet, an armature in circuit relation with the winding of said electromagnet, a second electromagnet angularly displaced with reference to said first magnet, a source of electricity for both of said electromagnets and means for reversing the current from said source through said first named magnet and the armature.

12. In an indicator a signal arm, and means for imparting a continuous-direction three-position movement thereto including a plurality of magnets, an armature having its windings in series in the same electrical current with one of said magnets and both under the influence of a reversible current, another of said magnets being in another circuit and under the influence of a single direction current, said armature being arranged to come serially under the influence of said magnets and to have continuous motion in one direction imparted thereto, a source of electricity and means for reversing the direction of the current through the armature and the magnet in series therewith.

In testimony whereof I have signed this specification in the presence of two subscribing witnesses.

THOMAS W. VARLEY.

Witnesses:
K. G. Le Ard,
Ivan Konigsberg.